CROSS REFERENCE SEARCH ROOM

Sept. 24, 1968 J. E. GEUSIC ETAL 3,403,260
PLURAL CHANNEL OPTICAL MEMORY USING COLOR TO DISCRIMINATE AMONG CHANNELS
Filed March 8, 1965 2 Sheets-Sheet 1

INVENTORS J. E. GEUSIC
J. G. SKINNER
BY Herbert M. Shapiro
ATTORNEY

United States Patent Office 3,403,260

Patented Sept. 24, 1968

3,403,260

PLURAL CHANNEL OPTICAL MEMORY USING COLOR TO DISCRIMINATE AMONG CHANNELS

Joseph E. Geusic, Berkeley Heights, and John G. Skinner, Basking Ridge, N.J., assignors to Bell Telephone Laboratories, Incorporated, New York, N.Y., a corporation of New York Filed Mar. 8, 1965, Ser. No. 438,022
2 Claims. (Cl. 250—219)

ABSTRACT OF THE DISCLOSURE

Reflective-type digital light deflector systems are herein provided with multiple channels for permitting increased addressing capacity. The system includes an arrangement for dividing the output of a digital light deflector into parallel secondary beams. Each secondary beam is passed through a different color filter and directed at one of a plurality of memory media. Thus light of a characteristic wavelength is directed at an associated medium. The now color coded secondary beams are reflected back into the deflector by a mirror in the optical path beyond each memory medium. A detector at the input end of the light deflector detects the presence and absence of light at each characteristic wavelength thus indicating the presence and absence of an obstruction in the addressed positions of the associated media.

This invention relates to signal translating systems and, more particularly, to deflection systems employing electromagnetic wave radiation, typically visible light.

Light deflection systems, employed, for example, for accessing memories, typically comprise a source of a beam of light and a digital multistage light deflector for routing that beam to a selected output position in response to a particular combination of inputs to the stages thereof. The bit location of the memory corresponding to that selected position, accordingly, is accessed by the beam, and the presence or absence of an obstruction in the accessed location is registered by the absence or presence, respectively, of the beam at a detector adjacent the memory.

This arrangement, of course, is bit organized. Word organization, however, is frequently desirable. The latter is achieved by directing light in the output position of the light deflector to the corresponding bit location on each of a plurality of memory media. Typically, these "media" are formed on one memory plane as shown in "Large-Capacity Memory Techniques for Computing Systems," edited by Yovits, pages 79 et seq. The "fanout" of light from a selected output position of a deflector to a plurality of bit locations is frequently termed "paralleling." The apparatus for achieving the fanout is conveniently termed a "multiple channel arrangement."

It has been found recently that a marked improvement in signal-to-noise ratio is achieved by reflecting light back through a memory plane, back through the light deflector to a detector positioned near the source of the light beam. This arrangement, termed a "reflective-type light deflection system" is incompatible with the described multiple channel arrangement. The reason for this is that a reflective-type light deflection system typically includes mirrors next adjacent the memory plane. If a multiple channel arrangement is used to divide the light in a selected output position of a deflector, mirrors next adjacent the memory planes merely reconstitute the divided light, upon reflection thereby, into a single beam at that position for retraversing the forward transmission path of the light. The information in the several bit locations is lost when that beam is reconstituted. Reflective-type light deflection systems, consequently, are presently operable only on a bit-organized basis. The path retraversed by the reflected light may be thought of as a mirror image path as is discussed in the aforementioned application and it is so designated herein.

It is an object of this invention to provide a reflective-type light deflection system for addressing word-organized memories.

The above and further objects of this invention are realized in one embodiment thereof wherein a plurality of different wavelengths are included in the input light beam to a light deflector of the reflective type. Storage media are positioned in a multiple channel arrangement. Adjacent each medium is a bandpass filter. By choosing each filter to pass light at a different wavelength or a different band of wavelengths, the light returned to the deflector comprises wavelengths characteristic for each medium. Rather than merely reconstituting the forward transmission beam upon reflection, the returning beam in each instance includes information from the corresponding bit location in the memory media in the form of the presence or absence of light of a characteristic wavelength (or wavelengths).

Accordingly, a feature of this invention is a reflective-type light deflection system including a multiple channel arrangement wherein each memory medium has positioned adjacent thereto a filter for passing light of a characteristic wavelength.

The foregoing and further objects and features of this invention will be understood more fully from a consideration of the following detailed description rendered in conjunction with the accompanying drawing, wherein.

Figure 1:
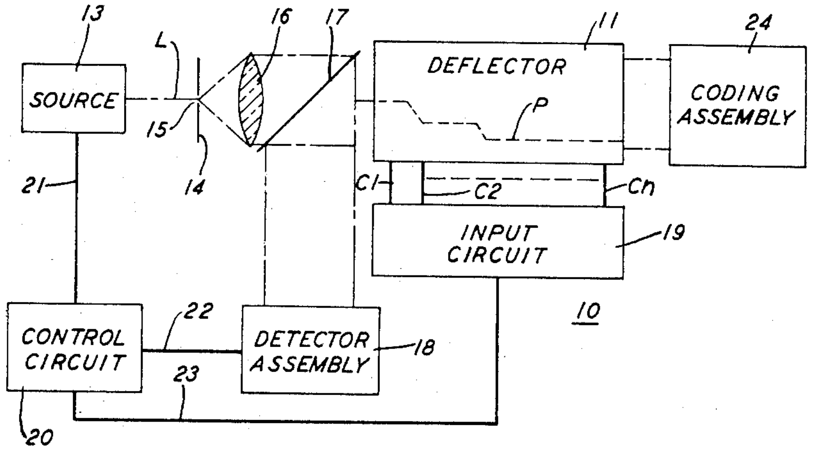
FIG. 1 is a schematic arrangement of a reflective-type multiple chanel light deflection system in accordance with this invention.

FIG. 1 shows an illustrative light deflection system 10 in accordance with this invention. The system includes a multistage light deflector 11 with a source of plane polarized light 13 positioned adjacent its input end (the left end as viewed in the figure). Source 13 is spaced apart from deflector 11 by a plate 14 having an aperture 15 therein, by a lens 16, and by a beam splitter 17. Adjacent beam splitter 17 is a detector assembly 18. An input circuit 19 is connected to the various stages of deflector 11 by means of conductors C1, C2 . . . C*n*. Source 13, detector assembly 18, and input circuit 19 are connected to a control circuit 20 by means of conductors 21, 22, and 23, respectively. A coding assembly 24 is positioned adjacent the output end (to the right as viewed in the figure) of deflector 11.

Figure 2:
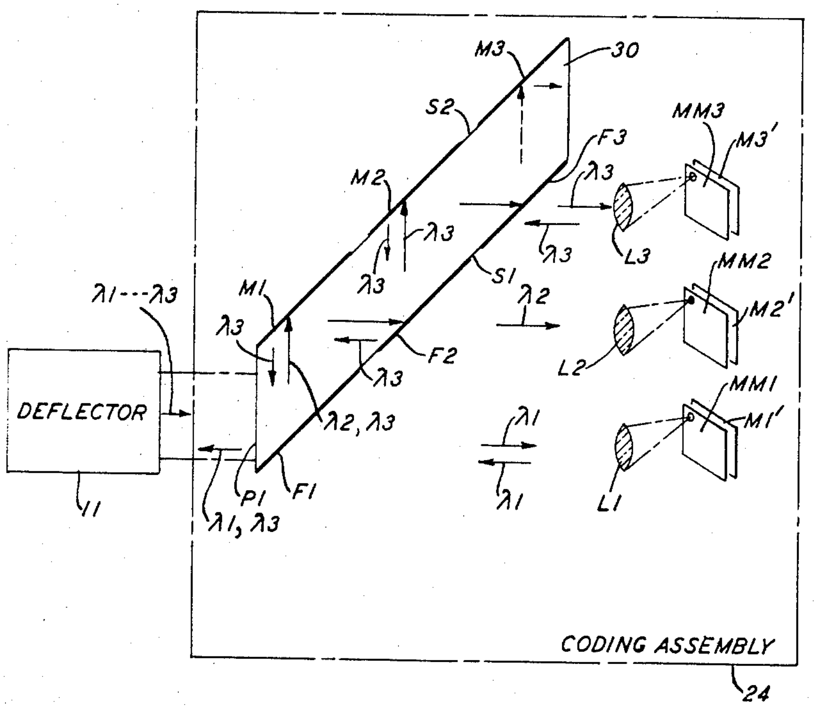
FIGS. 2 and 3 are schematic arrangements detailing portions of the system of FIG. 1.

The coding assembly 24 is shown in detail in FIG. 2. The assembly includes a plate 30 transparent to light at the wavelengths included in the beam from source 13. Such a plate may comprise quartz or glass of suitable transparency. The plate has two substantially parallel sides S1 and S2 and an end portion P1 shown substantially parallel to the output end of detector 11. Color sensitive (bandpass) filters, illustratively three filters, F1, F2, and F3, each transparent at a characteristic wavelength are deposited, by well known evaporation techniques, on the side S1 of plate 30. Mirrors M1, M2, and M3, which are totally reflecting at a characteristic wavelength, are deposited on side S2 of plate 30 in positions corresponding to different filters as is explained hereinafter. Lenses L1, L2, and L3, memory media MM1, MM2, and MM3, and mirrors M1', M2', and M3' are arranged in like numbered sets adjacent correspondingly numbered filters.

Figure 3:
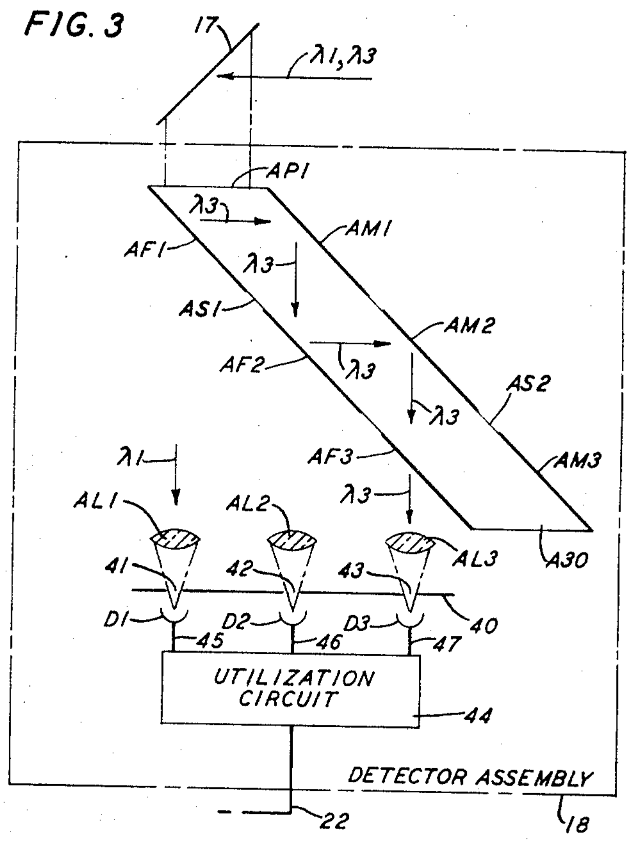

The detector assembly 18, as shown in FIG. 3, is similar to coding assembly 24 and similar elements therein are designated as in coding assembly 24, the designations being preceded by an A to avoid ambiguity in designations and yet to demonstrate the similarities between the two assemblies. Specifically, detector assembly 18 includes a plate A30 having sides AS1 and AS2 and an end portion AP1. Mirrors AM1, AM2, and AM3 are positioned on a side AS2 of plate A30. Filters AF1 and AF2, and AF3 are positioned on a side AS1. Lenses AL1, AL2, and AL3 are positioned adjacent filters AF1, AF2, and AF3, respectively. A plate 40 including apertures 41, 42, and 43 is positioned adjacent lenses AL1, AL2, and AL3 such that the apertures and the lenses are aligned. Detectors D1, D2, and D3 are positioned adjacent apertures 41, 42, and 43. A utilization circuit 44 is connected to each of detectors D1, D2, and D3 by conductors 45, 46, and 47, respectively.

Operation of the light deflection system of FIG. 1 on a word-organized basis is described now in terms of an illustrative binary word 101 stored in a representative word location. A word location comprises the corresponding bit location on each of the memory media employed, illustratively three. Operation is, essentially, in terms of a read only memory. Writing into a memory of this type is described briefly hereinafter.

Specifically, source 13 (FIG. 1) provides a beam of light under the control of control circuit 20. The beam is shown in FIG. 1 as a broken line designated L. Beam L passes through aperture 15 in plate 14, through lens 16, and through beam splitter 17 into light deflector 11. Aperture 15 forms the image and lens 16 broadens the image providing parallel ray input to deflector 11. A beam splitter is a partially silvered mirror, here half-silvered, permitting partial reflection and partial transmission of light incident thereto. Beam L follows a prescribed path, designated P in FIG. 1, through deflector 11 as dictated by a voltage-no voltage code applied to the stages of deflector 11 by input circuit 19 under the control of control circuit 20. More specifically, each stage of the deflector includes an optical element for selectively rotating the plane of polarization of input light in response to the presence or absence of a voltage thereacross. Each stage also includes a birefringent element for passing light along one of two paths (or angles) depending on the plane of polarization. The structure and operation of deflector 11 are well known and a description thereof is unnecessary to an understanding of this invention. Accordingly, a full description thereof is omitted here. It is important to understand, however, that the light is routed to a prescribed output position at the output end of deflector 11 and light in that output position is focused by lenses L1, L2, and L3 (FIG. 2) on the memory media MM1, MM2, and MM3, respectively. The representative bit location on each medium is shown as a blackened or unblackened spot in the figure. A blackened spot represents an obstruction to light incident thereto and, accordingly, is taken to correspond to a stored "zero" registering as a null in the corresponding detector as described hereinafter. An unblackened spot corresponds to a stored "one." In accordance with the assumed illustrative word 101, memory medium MM2 includes a blackened spot in the representative bit location; memory media MM1 and MM3 include unblackened spots in the correspoding bit locations there.

If light from source 13 is represented as including wavelengths λ1, λ2, and λ3 and filters F1, F2 and F3 are chosen to pass light at those wavelengths, respectively, and to reflect light at other wavelengths, light only of wavelength λ1 passes filter F1. Similarly, filter F2 passes light only of wavelength λ2, and filter F3 passes light only of wavelength λ3. In each instance, the light not passed by the filter is reflected to the corresponding mirror M1 (M2 and M3 for other wavelengths) which directs essentially all the light at the corresponding filter.

Light of wavelength λ2 is focused, already described, on the representative spot of memory media MM2. Since that spot is blackened, light of wavelength λ2 is extinguished. Light of wavelengths λ1 and λ3 is directed to the unblackened spots on memory media MM1 and MM3, respectively. Those spots are transparent to the incident light and that light passes to mirrors M1' and M3' to be reflected back through the coding assembly, back through the deflector 11, in a known manner, to beam splitter 17. The beam splitter directs a portion of the returning light to detector assembly 18.

Light enters detector assembly 18 by means of end portion AP1. That light is directed at filter AF1 which passes light only of λ1 wavelength and reflects the remaining light to mirror AM1. Mirror AM1, in turn, reflects all incident light to filter AF2. Filter AF2 passes light only of wavelength λ2 reflecting the remaining light to mirror AM3. Similarly, light only of wavelength λ3 passes filter AF3. Since light of wavelength λ2 was extinguished in the coding assembly, no light passes filter AF2. That light which does pass filters AF1, AF2 and AF3 passes to lenses AL1, AL2, and AL3, respectively, and is directed through apertures 41, 42, and 43 in plate 40. In accordance with the assumed illustrative embodiment, light of wavelength λ1 is directed through aperture 41, no light of wavelength λ2 is directed through aperture 42, and light of wavelength λ3 is directed through aperture 43. Detectors D1 and D3 detect pulses; detector D2 detects a null. The pulses and absence of a pulse are registered in utilization circuit 44. In this connection, it is important that light corresponding to each memory medium reach detectors D simultaneously. This is insured, for example, by providing like distances from the source to each memory medium to the corresponding detector.

Figure 4:
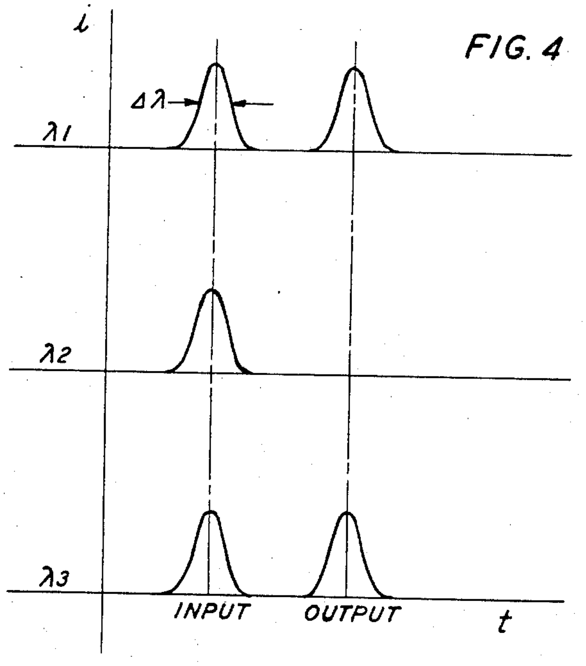
FIG. 4 is a graph of an illustrative input and output produced during the operation of the system of FIG. 1.

FIG. 4 shows light pulses of wavelengths λ1, λ2, and λ3 on a light intensity versus time graph. A light pulse at each wavelength is directed into coding assembly 24; light of wavelengths λ1 and λ3 emerges to be detected by detectors D1 and D3, respectively. The light of wavelength λ2 is absent. The output pulse has a duration substantially equal to that of the input pulse and is detected after the input pulse at a time determined by the transit time of light through the system from source to detector.

The various sources, circuits, filters, mirrors, and other elements described herein may be any such elements capable of operating in accordance with this invention.

It is to be understood that some deflectors operate by deflecting incident light through one of two angles, depending on the polarization of that light, at each stage. An output position, accordingly, is actually light at a particular angle of propagation focused at a particular "output position" in an imaginary image plane. As is mentioned hereinbefore, in FIG. 2 lenses L1, L2, and L3 (see FIG. 2) provide the focusing, and memory media MM1, MM2, and MM3 are positioned in the image planes of those lenses each providing bit locations to correspond to those output positions.

The invention has been described in terms of a read only memory for which a photographic plate, for example, may be prepared by external means well known. The system as shown in FIG. 1, however, may be used to provide obstructions on an unexposed photographic film. Specifically, for a write operation, source 13 provides light of wavelengths λ2 for exposing only the bit location of memory medium MM2 in accordance with the illustrative operation. The film is developed before read operations of course. In this connection, although the description is in terms of single wavelengths, bands of wavelength may be, and in practice are used. In this case, each pulse as shown in FIG. 4 includes a number of wavelengths. This is indicated in FIG. 4 by the arrows designated Δλ. The filters and mirrors are chosen accordingly.

The permissible wavelength spread of a beam from source 13 is determined primarily by the specification placed on the electro-optical elements in the deflector in order to minimize, for example, cross talk between different output positions. A typical electro-optic element of, for example, potassium tantalate niobate (KTN) permits a wavelength spread of 500–1000 Angstrom units. Filters useful in accordance with this invention need be limited only by number and by wavelength spread to operate within the dictates imposed by the electro-optic elements of the deflector. The wavelength spread is, advantageously, kept to a minimum. The described embodiment is designed to provide such a minimum using bandpass filters, presently available with a bandwidth of three Angstrom units. For example, well known multilayer bandpass filters comprising alternate layers of magnesium fluoride ($MgF_2$) and zinc sulfide (ZnS) on a glass substrate are suitable in accordance with this invention. Such filters are described in "Reports on Progress in Physics," O. S. Heavens, pages 1 through 65, volume 23, published by the Physical Society, London, 1960. Such filters in their more simple form are commonly known as Fabry-Perot filters. Other systems, however, contemplated within the scope of this invention employ well known multilayer color selective reflectors. Multilayer color selective reflectors suitable in accordance with this invention are of a type consistent with the description of "Periodically Stratified Media" in "Principles of Optics," Born and Wolf, page 65 et seq., Pergamon Press, Inc., 1959. In this connection, the memory plane comprises color selective reflectors which, for example, are selectively etched by well known photoresist techniques to pass incident light unreflected. Unetched locations thereon reflect light to provide a detectable output. Such reflectors may be used as the mirrors M1', M2', and M3' in the absence of plate 30 and the filters and mirrors thereon, and in the absence of the memory media. Unetched reflectors, similarly, may be used in cooperation with a memory media such as an exposed photographic plate to reflect color coded light passed to it.

In one specific embodiment, an argon gas maser provides a beam of polarized light emitting wavelengths 4545 Angstrom units (A.), 4579 A., 4658 A., 4727 A., 4765 A., 4880 A., 4965 A., 5017 A., 5145 A., 5287 A. An input pulse of $10^{-7}$ to $10^{-9}$ seconds duration provides an output pulse of like duration detected $10^{-8}$ seconds after the termination of the input pulse. The deflector employs twenty stages each including a quartz Wollaston prism and a potassium tantalate niobate (KTN) modulator. The filters (on plate 30) are of multilayers of magnesium, fluoride and zinc sulfide, having bandwidths of ten Angstrom units and transmission peaks at the above listed wavelengths. The mirrors (on plate 30) are of aluminum with a silicon monoxide overlay. Plate 30 is composed of fused silica glass. The filters and mirrors are deposited by well known evaporation techniques. The memory media are developed photographic plates, spots being developed by external means. The mirrors adjacent the memories are typically of fused silica glass with an aluminum coating and a silicon monoxide overlay. The distance from the source to each memory medium (actually to the mirror adjacent each memory medium) is 150 centimeters. A like distance separates each detector from the corresponding memory medium.

Accordingly, it is to be understood that the specific embodiment of this invention described herein is merely illustrative and that numerous other arrangements according to the principles of the invention may be devised by one skilled in the art without departing from the spirit and scope of this invention.

We claim:

1. A word-organized memory comprising a source of an input beam of plane polarized light having a band of wavelengths, a multistage digital light deflector wherein the path of light transmitted by said deflector is determined responsive to the coded presence and absence of voltages across the various stages therein, each of said stages comprising means for selectively rotating the plane of polarization of said input beam and birefringent means for transmitting said input beam along different paths depending upon the plane of polarization, said deflector having input and output ends and being arranged in the optical path of said input beam, means for dividing the beam at said output end into a plurality of spaced apart secondary beams, a plurality of memory media each in the path of a different one of said secondary beams and including the presence and absence of obstructions to light defining one bit of each memory word, means including a filter in the path of each of said secondary beams for passing to the associated memory medium light of a characteristic wavelength different from that passed to the other of said memory media, a mirror positioned in the optical path adjacent each of said memory media to retroflect into said output end at the position from which emanated the secondary beam passed by the associated memory medium while the voltage code is maintained, means separating said secondary beams from said input beam, and detection means for detecting the presence and absence of light at each of said characteristic wavelengths.

2. A memory in accordance with claim 1 wherein said detection means comprises means for separating said secondary beams, a plurality of bandpass filters each passing light at a characteristic wavelength, a plurality of lenses each associated with a different one of said filters for focusing light therefrom, and a plurality of detectors each associated with a different one of said lenses for detecting light of characteristic wavelength passed through the associated filter.

References Cited

UNITED STATES PATENTS

Re. 26,170 3/1967 Harris.

DAVID SCHONBERG, *Primary Examiner.*

R. J. STERN, *Assistant Examiner.*